March 15, 1966 P. J. HERZL 3,241,133

DIGITAL TO ANALOG VOLTAGE CONVERTER

Filed Nov. 6, 1962 3 Sheets-Sheet 1

INVENTOR.
Peter J. Herzl
BY
Cushman, Darby & Cushman
ATTORNEYS

DIGITAL TO ANALOG VOLTAGE CONVERTER

Filed Nov. 6, 1962 3 Sheets-Sheet 2

INVENTOR.
Peter J. Herzl
BY
Cushman, Darby & Cushman
ATTORNEYS

March 15, 1966 P. J. HERZL 3,241,133

DIGITAL TO ANALOG VOLTAGE CONVERTER

Filed Nov. 6, 1962 3 Sheets-Sheet 3

INVENTOR.
Peter J. Herzl
BY
Cushman, Darby & Cushman
ATTORNEYS

United States Patent Office 3,241,133
Patented Mar. 15, 1966

3,241,133
DIGITAL TO ANALOG VOLTAGE CONVERTER

Peter J. Herzl, St. Laurent, Quebec, Canada, assignor to Renwell Industries, Inc., South Hadley Falls, Mass., a corporation of Delaware Filed Nov. 6, 1962, Ser. No. 235,786
21 Claims. (Cl. 340—347)

Figures 1, 2, 3:
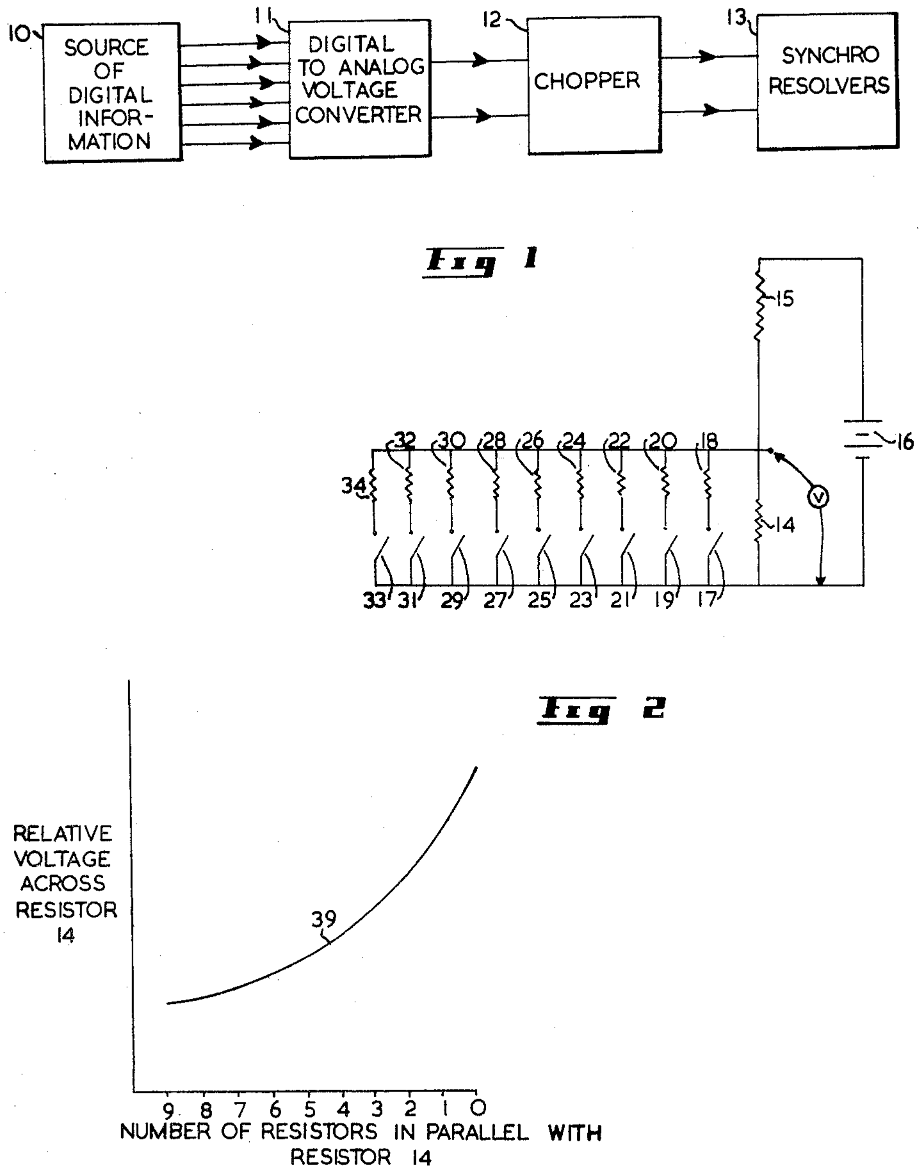

The present invention relates to a digital to analog voltage converter and in particular to a novel type of converter wherein the analog voltage output of the digital input is a trigonometric function of the digital input.

The present invention also relates to a digital to analog voltage converter which provides a pair of analog voltages representative of complementary trigonometric functions of the digital input. Thus, for example, if a digital input is applied to the converter representative of a number, then analog voltage outputs are obtained which are representative of the sine and cosine of the number. Such a digital to analog converter is particularly useful wherein the digital input is to be used to control the shaft angle of the rotor of a synchro resolver which may be used, for example, in positioning a machine tool.

The present invention also provides a digital to analog voltage converter using transistors which may be connected, for example, in a common collector circuit, thereby providing a digital to analog voltage converter with high accuracy and requiring no moving parts such as relays or switches. It will be evident to those skilled in the art of course, that other types of switching devices may be used in the present invention and that the preferred form of the invention makes use of transistors.

In accordance with the present invention, a digital to analog voltage converter comprises, a plurality of switching means each connected in series with a weighting resistor to form a plurality of series combinations. These series combinations are connected in parallel to form a ladder network, and are provided with means biasing said switching devices to a predetermined conductive state. Input means are included for selectively energizing said switching means to the opposite conducting state in accordance with a digital input. A first resistor of predetermined value is connected across said ladder network, and a second resistor of predetermined value is connected between one side of said first resistor of predetermined value and one terminal of a source of voltage, the other terminal of said source of voltage being connected to the other side of said first resistor of predetermined value. The weighting resistors are proportioned to cause the voltage across the first resistor of predetermined value to be a trigonometrical function of the digital input.

Further, the invention also provides a digital to analog voltage converter which comprises a first plurality of switching means each connected in series with a resistor of a first series of weighting resistors to form a plurality of series combinations. These series combinations are connected in parallel to form a first ladder network, and means are provided biasing said first plurality of switching means to a predetermined conductive state. A first resistor of predetermined value is connected across said first ladder network, and a second resistor of predetermined value is connected between one end of said first resistor and one terminal of a source of voltage, the other terminal of said voltage source being connected to the other end of said first resistor of predetermined value. The invention also comprises a second plurality of switching means each connected in series with a resistor of a second series of weighting resistors to form a second plurality of series combinations. The second plurality of series combinations is connected in parallel to form a second ladder network, and means are provided biasing said second plurality of switching means to a conductive state complementary to the conductive state of said first plurality of switching means. A third resistor of predetermined value is connected across said second ladder network, and a fourth resistor of predetermined value is connected between one end of said third resistor of predetermined value and said one terminal of said voltage source, said other terminal of said voltage source being connected to the other end of said third resistor of predetermined value. Input means are provided for selectively energizing said first and second pluralities of switching means in accordance with a digital input, said first and second series of weighting resistors being proportioned to cause the voltage across said first and third resistors of predetermined value to be complementary trigonometrical functions of said digital input.

The present invention thus provides a digital to analog voltage converter wherein the analog output voltage is a trigonometrical function of the digital input and also provides a digital to analog voltage converter having two analog voltage outputs which are complementary trigonometrical functions of the digital input.

By the use of suitable choppers, a direct current output from the converter may be used to position synchro resolvers. With the apparatus of the present invention, if sine and cosine functions of the digital input are generated by the converter, then a synchro resolver may accurately be positioned within a few minutes of arc for the control of devices such as machine tools.

Figure 4:
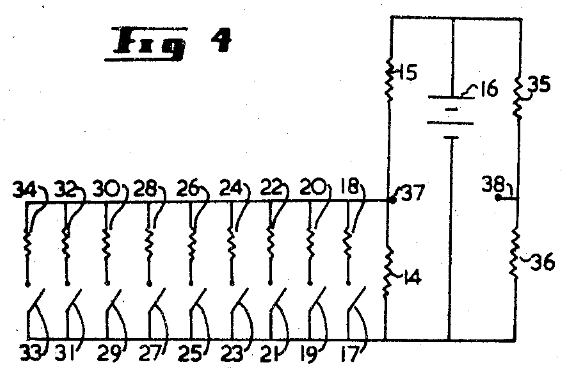
Figure 6B:
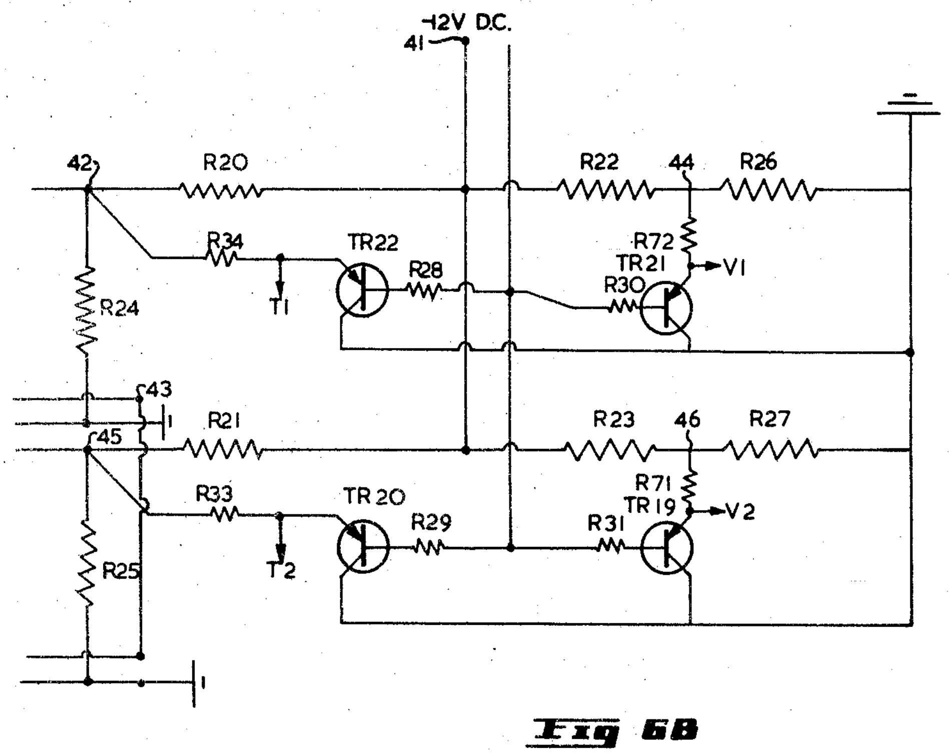
Figure 5:
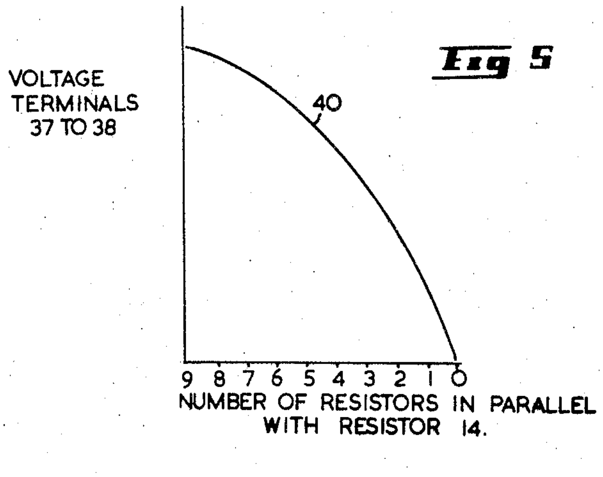
Figure 6A:
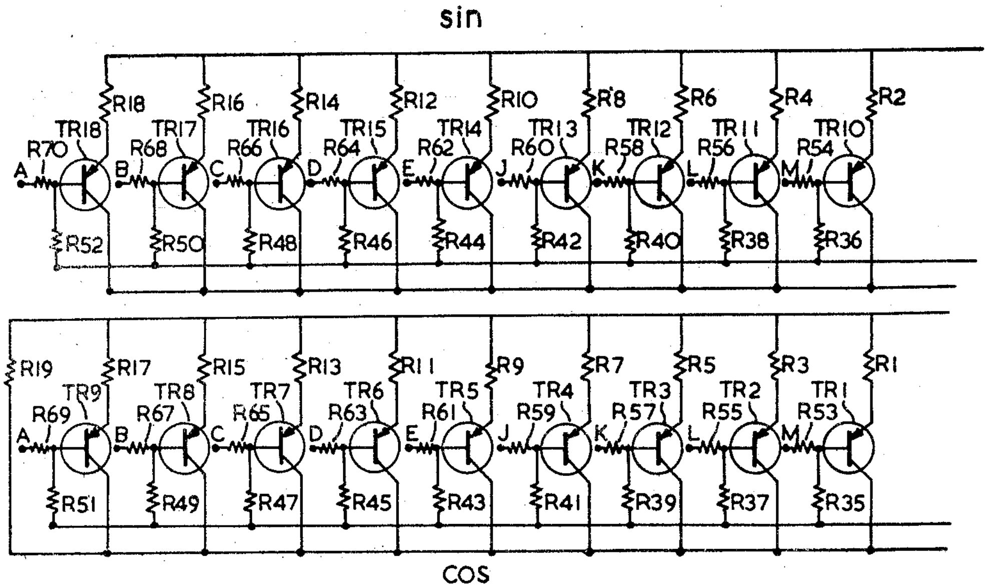

In drawings which illustrate embodiments of the present invention:

FIG. 1 is a block diagram of a machine tool control including the digital to analog voltage converter of the present invention, FIG. 2 is a schematic diagram representing in simplified form the digital to analog voltage converter of the present invention, FIG. 3 is a graph illustrating the operation of the apparatus shown in FIG. 2, FIG. 4 is a schematic diagram in simplified form of an alternative construction of digital to analog voltage converter of the present invention, FIG. 5 is a graph illustrating the operation of the apparatus of FIG. 4, and FIGS. 6*a* and 6*b* illustrate an embodiment of the present invention wherein direct current voltages are derived which are proportional to the sine and cosine of a digital input, and which analog voltages are subsequently chopped and applied to the sine and cosine coils of a synchro resolver.

FIG. 1 shows in block diagram form an apparatus which may be constructed in accordance with the teachings of the present invention for use of a digital to analog voltage converter in the control of a synchro resolver. In particular, FIG. 1 shows a source of digital information 10 which may be punched paper tape, or cards, or digital information stored magnetically, or electrostatically on any suitable record medium, or other suitable source of digital information, which provides a digital input for the digital to analog voltage converter 11. As illustrated in FIG. 1, this digital to analog voltage converter 11 has a pair of outputs which are fed to a chopper 12 and subsequently to synchro resolvers 13, which are positioned in accordance with the output of the digital to analog voltage converter 11. The output of the digital to analog voltage converter 11 consists of sine and cosine functions, for example, of the digital input from the source of digital information 10, thus the values of the outputs from the digital to analog voltage converter 11 would normally be sine and cosine functions of the digital input and may be in form of D.C. voltages. These D.C. voltages are chopped by the chopper 12 to provide fluctuating voltages whose amplitudes are proportional to the sine and cosine of the digital input. These fluctuating voltages are fed to the synchro resolver 13, to position the rotor of the synchro resolver in a position indicated by the digital input. If the output of the digital to analog voltage converter 11 is an alternating current voltage, the chopper 12 can be dispensed with and the output from the digital to analog voltage converter applied directly to the coils of the synchro resolver 13.

FIG. 2 shows a schematic diagram in simplified form of a form of the apparatus of the present invention. A first resistor of predetermined value 14 is connected in series with a second resistor of predetermined value 15 and across a source of direct current voltage 16. A plurality of switches and weighting resistors 17–18, 19–20, 21–22, 23–24, 25–26, 27–28, 29–30, 31–32, and 33–34 are connected in a ladder network, which is connected across the first resistor of predetermined value 14. It will immediately be appreciated that the voltage across the resistor 14 is a function of the number of switches which are closed.

FIG. 3 shows diagrammatically the voltage across resistor 14 with changes in the number of resistors in parallel with resistor 14. The curvature of the curve 39 depends on the values of resistors 14, 15 and weighting resistors 18, 20, 22, 24, 26, 28, 30, 32, and 34. By suitably adjusting the values of these resistors, the curvature of curve 39 may be made to approximate a sine curve.

FIG. 4 illustrates an alternative embodiment in simplified schematic form in accordance with the present invention. FIG. 4 is similar to the circuit shown in FIG. 2, with the addition of resistors 35 and 36 and terminals 37 and 38. If resistor 35 has the same resistance as the resistance of resistor 15 and similarly if resistor 36 has the same resistance as resistor 14, then the voltage between terminals 37 and 38, when all of the switches 17 to 33 are open, will be zero. As the number of the switches 17 to 33 which are closed, is increased, the voltage between terminals 37 and 38 will increase.

FIG. 5 illustrates graphically the manner in which the voltage between terminals 37 and 38 changes with the number of resistors in parallel with resistor 14. It will also be appreciated that by adjusting the relative values of the resistors in the circuit that the curvature of the curve 40 in FIG. 5 may be made to approximate to the curvature of a sine or cosine curve.

FIGS. 6*a* and 6*b* illustrate a preferred embodiment of the invention which consists of a digital to analog voltage converter, which provides voltage analogs of the sine and cosine of a digital input. In FIG. 6, these voltage analogs are direct current voltages and, accordingly, choppers are included periodically to interrupt the direct current voltages so that they may be fed to the coils of a synchro resolver to position its shaft. If an alternating current source of voltage were used instead of a direct current source, then the choppers would not be necessary.

The sine and cosine portions of the digital to analog converter may be considered separately, although it will be appreciated that these two portions of the converter are intended to operate simultaneously. It will immediately be evident to those skilled in the art that both the sine and cosine portions of the converter are constructed in the form of the circuit of FIG. 4. Thus, resistor R24 in the upper or sine portion corresponds to resistor 14, resistor R20 corresponds to resistor 15 of FIG. 4, and resistors R22 and R26 correspond to resistors 35 and 36 of FIG. 4. Similarly, in the lower or cosine portion of the circuit of FIG. 6, resistors R25 and R21 correspond to resistors 14 and 15 of FIG. 4, and resistors R23 and R27 correspond to resistors 35 and 36 in FIG. 4. It will also be noted that each of the switch means in the ladder circuits of the sine and cosine portions of the converter is a PNP transistor, which is biased into a non-conducting stage by a voltage of +6 volts applied at terminal 43. If NPN transistors were used then the voltage required to bias them to a non-conducting state would be approximately −6 volts in the circuit as illustrated in FIG. 6, and the polarity of other voltages applied to the circuit similarly would have to be reversed. A direct current voltage of +12 volts is applied at terminal 41 and impressed across resistors R20 and R24 in series. This voltage is also impressed across resistors R22 and R26. Resistor R22 is the same value as resistor R20, and resistor R26 is the same value as resistor R24. Thus, in the absence of any other circuitry, the voltage at point 42, which is the junction between R20 and R24, would be identical with the voltage at point 44, which is the junction between resistor R22 and resistor R26. A ladder circuit consisting of transistors TR10 to TR18 and resistors R2 and R18 is connected across resistor R24. Thus, the voltage across R24 will vary in dependence on the number of transistors TR10 to TR18, which are conducting. It will be noted that the transistors TR10 or TR18 are connected in a grounded or common collector circuit as a better ratio between cutoff current and saturated current can be obtained. Input terminals A, B, C, D, E, J, K, L and M are provided at the base of each of the transistors TR10 to TR18, so that a digital input may be applied to these terminals to cause selected transistors to change their conductive state.

As mentioned above, a voltage of +6 volts is applied at the terminal 43 to cut-off transistors 10 to 18 inclusive in the absence of any digital input signal. When all transistors are cut off, the voltage at point 42 is equal to the voltage at point 44. If an input is applied to terminal M to cause transistor TR10 to conduct and saturate, the resistor R2 is then in parallel with R24 and the voltage at point 42 is lowered. As additional resistors are added in parallel with R24, it will be seen that the voltage at point 42 will be further decreased. By suitably adjusting the values of the weighting resistors R2 to R18, inclusive, the voltage appearing at point 42 can be made a sine function of the value of the digital input applied at terminals A, B, C, D, E, J, K, L and M.

The complement of the digital input to the sine converter is simultaneously applied to terminals A′, B′, C′, D′, E′, J′, K′, L′, and M′ of the cosine voltage converter and the transistors TR1 to TR9, inclusive, are driven to saturation in the absence of an input signal to the sine converter. This places transistors TR1 to TR9 in a conductive state (conducting) which is opposite to the then existing non-conducting state of transistor TR10 to TR18. In the absence of a complement signal to any input terminal A′–M′, the associated transistor TR1–TR9 is held non-conducting by the 6 volts base bias applied at terminal 43 in FIG. 6B. Of course, the transistor sets TR1–TR9 and TR10–TR18 may be normally in different conductive states by different well known biasing arrangements, in which case the input signals to terminals A′–M′ would be the same as those to terminals A–M instead of the complement thereof. Using the complement with the cutoff bias from terminal 43 to both transistor sets, however, in the absence of a signal to the sine converter, resistors R1, R3, R5, R7, R9, R11, R13, R15, R17 and R19 are all connected in parallel with resistor R25 and the voltage at point 45 in a minimum. When a digital input is removed from terminals A′, B′, C′, D′, E′, J′, K′, L′ and M′ of the cosine analog voltage converter (at the same time that the same input is being applied to the sine converter), the selected transistors will be caused to shut off by the bias voltage at point 43 and the voltage across R25 will increase. By adjusting the weighting resistors, R1 to R19, the voltage across resistor 25 can be made substantially the cosine of the numerical value of the digital input. By suitable adjustment of the series of weighting resistors R1, R3, R5, R7, R9, R11, R13, R15, R17, R19 and R2, R4, R6, R8, R10, R12, R14, R16 and R18, it is possible to obtain an accuracy in the ratio of the sine to cosine, showing a maximum error of several minutes of arc.

The values of components used in a digital analog converter constructed in accordance with the teachings of FIG. 6 of this application are as follows: transistors TR1, TR2, TR3, TR4, TR5, TR6, TR9, TR10, TR11, TR12, TR13, TR14, TR15, and TR18—2N1303; transistors TR8 and TR17 omitted; transistors TR19, TR20, TR21, TR22, TR7 and TR16—2N1305; resistors R1, R2 and R19, 20,000Ω, ½ w., 5%; R3, R4, R7 and R8, 10,000Ω, ½ w., 1%; R5, R6, 5,000Ω, ½ w., 1%; R9, R10, 2,000Ω, ½ w., 1%; R11, R12, R17 and R18, 1,000Ω, ½ w., 0.5%; R13, R14, 499Ω, ½ w., 0.1%; R15 and R16 omitted; R20, R21, R22, R23, 200Ω, 1 w., 0.1%; R24, R25, R26 and R27, 294Ω, ½ w., 0.1%; R32 not used; R29, R30, R31, R28, 680Ω, ½ w., 5%; R33, R34, 681Ω, ½ w., 1%; R35, R36, R37, R38, R39, R40, R41 and R42, 1500Ω, ½ w., 10%; R43, R44, R45, R46, R47, R48, R51 and R52, 680Ω, ½ w., 10%; R49 and R50 omitted; R53, R54, R55, R56, R57, R58, R59, R60, 1200Ω, ½ w., 10%; R61, R62, R63, R64, R65, R66, R69 and R70, 560Ω, ½ w., 10%; R67 and R68 omitted.

The voltages applied to this converter are as shown on FIG. 6.

The voltage between points 42 and 44 and between points 45 and 46, as shown in FIG. 6, is chopped by transistor chopper consisting of transistors TR21 and TR22 and transistors TR19 and TR20, and the output from the choppers taken at terminals T1, V1 and T2, V2 is applied to the sine and cosine terminals of a synchro resolver to position the synchro in accordance with the numerical value of the digital input.

It will be appreciated by those skilled in the art that the digital to analog converter of the present invention may be adapted to decode binary or other digital codes or may be used in a digital notation wherein each digit is a representation of an equal numerical value. For example, each digit in the code could be representative of 9° of arc, so that the presence of 10 digits in a digital input would be indicative of an angle of 90°, and the presence of no digits would be indicative of an angle of 0°. In the event that the digital input contained no digits, then the voltage across resistor 24 would be equal to the voltage across resistor 26 and no output would appear at terminals T1, V1. Similarly, if there were no digits in a given input, the complement of this input would be applied to the cosine converter, causing all transistors to conduct, and the voltage across resistor 25 would be small in relation to the voltage across resistor 27 and a maximum output would be obtained from terminals T2, V2.

It will be apparent to those skilled in the art that numerous changes may be made to the invention as disclosed and the applicant does not wish to be limited to the specific embodiment shown in this application. For example, it is possible in accordance with the teachings of the invention to further subdivide an input into two or more subdivisions wherein the largest output of one subdivision is the same as the smallest output of the next subdivision. Thus, for example, it would be possible to divide the angle of 90° into 100 parts by providing a first decoder having 10 sections, each of which is equal to 9° and a second converter having 10 sections, each of which is equal to 0.9°. It should also be noted that many combinations of resistor values are possible within the limits of the present invention and the examples given above are based on practical experience with a machine tool control and have been adjusted to provide the optimum operation of available synchro resolvers.

I claim:

1. A digital to analog voltage converter comprising, a plurality of switching means each connected in series with a weighting resistor to form a plurality of series combinations, said series combinations being connected in parallel to form a ladder network, means biasing said switching devices to a predetermined one of the operating conditions "on" or "off", input means for selectively energizing said switching means to the opposite one of said operating conditions in accordance with a digital input, a first resistor of predetermined value connected across said ladder network, and a second resistor of predetermined value connected between one side of said first resistor of predetermined value and one terminal of a source of voltage, the other terminal of said source of voltage being connected to the other side of said first resistor of predetermined value, third and fourth resistors serially connected across said voltage source and respectively equal in value to said first and second resistors for forming at a point between the third and fourth resistors a reference potential, said weighting resistors being proportioned to cause the voltage across said first resistor of predetermined value to be, when compared to said reference potential, a sine or cosine function of said digital input according to whether said switching devices are biased as aforesaid to said "off" or "on" operating condition.

2. A converter as claimed in claim 1 wherein said switching means are transistors.

3. A converter as claimed in claim 2 wherein said switching means are biased to an "off" operating condition and wherein said weighting resistors are proportioned to cause the voltage across said first resistor of predetermined value to be a sine function of said digital input.

4. A converter as claimed in claim 2 wherein said switching means are biased to an "on" operating condition and wherein said weighting resistors are proportioned to cause the voltage across said first resistor of predetermined value to be a cosine function of said digital input.

5. A converter as claimed in claim 1 wherein said source of voltage is direct current.

6. A converter as claimed in claim 1 wherein said source of voltage is alternating current.

7. A converter as claimed in claim 2 wherein said transistors are connected in a grounded collector arrangement.

8. A converter as claimed in claim 5 and wherein means are provided periodically to interrupt said direct current voltage across said first resistor of predetermined value whereby to convert said direct current voltage to a pulsating voltage whose magnitude is said function of said digital input.

9. A digital to analog voltage converter comprising, a first plurality of switching means each connected in series with a resistor of a first series of weighting resistors to form a plurality of series combinations, said series combinations being connected in parallel to form a first ladder network, means biasing said first plurality of switching means to a predetermined conductive state, a first resistor of predetermined value connected across said first ladder network, a source of voltage, a second resistor of predetermined value connected between one end of said first resistor and one terminal of said source of voltage, the other terminal of said voltage source being connected to the other end of said first resistor of predetermined value, third and fourth resistors serially connected across said voltage source and respectively equal in value to said first and second resistors for forming at a point between the third and fourth resistors a first reference potential which equals the potential between said first and second resistors when each of said switching means is in a nonconducting state, a second plurality of switching means each connected in series with a resistor of a second series of weighting resistors to form a second plurality of series combinations, said second plurality of series combinations being connected in parallel to form a second ladder network, a fifth resistor of predetermined value connected across said second ladder network, a sixth resistor of predetermined value connected between one end of said third resistor of predetermined value and said one terminal of said voltage source, said other terminal of said voltage source being connected to the other end of said third resistor of predetermined value, seventh and eighth resistors serially connected across said voltage source and respectively equal in value to said fifth and sixth resistors for forming at a point between the seventh and eighth resistors a second reference potential, and means, including input means for selectively energizing said first and second pluralities of switching means in accordance with a digital input, for causing the conductive state of said second plurality of switching means to be complementary to the conductive state of said first plurality of switching means, said first and second series of weighting resistors being proportioned to cause the voltage across said first and fifth resistors of predetermined value to be, when respectively compared to said first and second reference potentials, complementary sine and cosine functions of said digital input.

10. A converter as claimed in claim 9 wherein said switching means are transistors.

11. A converter as claimed in claim 9 wherein said first plurality of switching means is biased to a conducting state, and said second plurality of switching means is biased to a non-conducting state, and wherein said first series of weighting resistors are proportioned to cause the voltage across said first resistor of predetermined value to be a sine function of said digital input, and said second series of weighting resistors are proportioned to cause the voltage across said fifth resistor of predetermined value to be a cosine function of said digital input.

12. A converter according to claim 10 wherein said transistors are connected in a grounded collector arrangement.

13. A converter as claimed in claim 9 wherein said source of voltage is direct current.

14. A converter as claimed in claim 9 wherein said source of voltage is alternating current.

15. A converter as claimed in claim 13 and wherein means are provided periodically to interrupt said direct current voltages across said first and fifth resistors of predetermined value whereby to convert said direct current voltages to a pulsating voltage whose magnitudes are said complementary functions of said digital input.

16. A digital to analog voltage converter comprising, a first plurality of switching means each connected in series with a resistor of a first series of weighting resistors to form a plurality of series combinations, said series combinations being connected in parallel to form a first ladder network, a first resistor of predetermined value connected across said first ladder network, a second resistor of predetermined value connected between one end of said first resistor and one terminal of a source of voltage, the other terminal of said voltage source being connected to the other end of said first resistor of predetermined value, third and fourth resistors serially connected across said voltage source and respectively equal in value to said first and second resistors for forming at a point between the third and fourth resistors a first reference potential which equals the potential between said first and second resistors when each of said switching means is in a non-conducting state, a second plurality of switching means each connected in series with a resistor of a second series of weighting resistor to form a second plurality of series combinations, said second plurality of series combinations being connected in parallel to form a second ladder network, a fifth resistor of predetermined value connected across said second ladder network, a sixth resistor of predetermined value connected between one end of said third resistor of predetermined value and said one terminal of said voltage source, said other terminal of said voltage source being connected to the other end of said third resistor of predetermined value, seventh and eighth resistors serially connected across said voltage source and respectively equal in value to said fifth and sixth resistors for forming at a point between the seventh and eighth resistors a second reference potential, and means, including input means for selectively energizing said first and second pluralities of switching means in accordance with a digital input, for causing the conductive states of said first and second plurality of switching means to be complementary of each other at all times, said first and second series of weighting resistors being proportioned to cause the voltage across said first and fifth resistors of predetermined value to be, when respectively compared to said first and second reference potentials, complementary sine and cosine functions of said digital input.

17. A converter as in claim 16 wherein said means for causing the conductive states of said first and second pluralities of switching means to be complementary, includes means for biasing at least one of said pluralities of switching means to a non-conducting state.

18. A converter as in claim 17 wherein the other plurality of switching means is biased to a non-conducting state also, the selectively energizing input means being effective to energize said first and second pluralities of switching maens respectively in accordance with the non-complement and complement of said digital input.

19. A converter as in claim 16 wherein each of said switching means is a single transistor.

20. A converter as in claim 19 wherein said transistors are all connected in a grounded collector arrangement.

21. A converter as in claim 16 and including resolver means for effectively comparing the voltage across said first resistor with the said first reference potential and the voltage across said fifth resistor with the said second reference potential.

References Cited by the Examiner

UNITED STATES PATENTS

| | | | |
|---|---|---|---|
| 3,019,426 | 1/1962 | Gilbert | 340—347 |
| 3,027,079 | 3/1962 | Fletcher | 340—347 |
| 3,040,221 | 6/1962 | Fitzner | 340—347 |
| 3,042,911 | 7/1962 | Paradise et al. | 340—347 |
| 3,071,324 | 1/1963 | Shroeder et al. | 340—347 |

OTHER REFERENCES

RCA Technical Notes: Digital Control of Position Servos Requiring Minor Arc Operation, Nolan et al., RCA TN No. 353, June 1960.

MALCOLM A. MORRISON, *Primary Examiner.*